(12) United States Patent
Wang et al.

(10) Patent No.: US 11,911,840 B1
(45) Date of Patent: Feb. 27, 2024

(54) CONTINUOUS ROLLING DEVICE AND METHOD CONTINUOUS ROLLING DEVICE AND METHOD WITH INTERFACIAL TEMPERATURE-FORCE CONTROLLABILITY FOR SEAMLESS METAL CLADDING PIPE

(71) Applicant: TAIYUAN UNIVERSITY OF TECHNOLOGY, Taiyuan (CN)

(72) Inventors: Tao Wang, Taiyuan (CN); Ce Ji, Taiyuan (CN); Xingcheng Wang, Taiyuan (CN); Wenbin Feng, Taiyuan (CN); Hui Niu, Taiyuan (CN); Zhongkai Ren, Taiyuan (CN); Wenwen Liu, Taiyuan (CN); Qingxue Huang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/465,880

(22) Filed: Sep. 12, 2023

(30) Foreign Application Priority Data

Jun. 9, 2023 (CN) .......................... 202310678462.8

(51) Int. Cl.
 *B23K 20/00* (2006.01)
 *B23K 20/04* (2006.01)

(52) U.S. Cl.
 CPC .................................. *B23K 20/04* (2013.01)

(58) Field of Classification Search
 CPC ... B21B 19/04; B21B 25/00; B21B 2001/383; B21B 27/025; B21B 31/18; B21H 3/042;
 (Continued)

(56) References Cited

U.S. PATENT DOCUMENTS 2,017,386 A * 10/1935 Bannister ................ B21B 19/08
 72/97
4,712,407 A * 12/1987 Yoshiki ..................... B21C 1/24
 72/78
(Continued)

FOREIGN PATENT DOCUMENTS

CN 1135382 A 11/1996
CN 201186385 Y 1/2009
(Continued)

OTHER PUBLICATIONS

Huagui Huang et al., "Implementation and forming mechanism of the solid-liquid cast-rolling bonding (SLCRB) process for steel/Al clad pipes", Journal of Manufacturing Processes, vol. 30, Oct. 12, 2017.

(Continued)

*Primary Examiner* — Erin B Saad

(57) ABSTRACT

Disclosed are a continuous rolling device and method with interfacial temperature-force controllability for a seamless metal cladding pipe. The device comprises a multi-roller skew rolling mill set, an interfacial temperature-force controlled rolling mill set and a sizing and finishing mill set sequentially distributed along a rolling axis; and the interfacial temperature-force controlled rolling mill set comprises an interface temperature control module and an interface pressure control module sequentially distributed along the rolling axis, the interface pressure control module comprises two racks and a plurality of controlled rolling rollers circumferentially and evenly distributed along the rolling axis, two ends of the controlled rolling roller are respectively mounted on the two racks through corresponding screw-down apparatuses, and the interface pressure control module realizes passive driving through a spiral pushing force or a traction force.

7 Claims, 9 Drawing Sheets

(58) Field of Classification Search
CPC .... B23K 10/027; B23K 2101/20; B21C 1/24; B21C 3/16
See application file for complete search history.

(56) References Cited

U.S. PATENT DOCUMENTS

| | | | |
|---|---|---|---|
| 10,888,906 B2* | 1/2021 | Hidaka | C22C 38/02 |
| 10,913,103 B2* | 2/2021 | Zhou | B21H 3/042 |
| 11,273,483 B2* | 3/2022 | Zhou | B21H 3/04 |
| 2011/0023569 A1 | 2/2011 | Inage et al. | |
| 2015/0258591 A1 | 9/2015 | Higashida et al. | |
| 2016/0136721 A1* | 5/2016 | Zhou | B21H 3/044 72/114 |
| 2018/0354008 A1* | 12/2018 | Hidaka | C21D 6/007 |
| 2020/0263282 A1* | 8/2020 | Hidaka | C21D 9/0068 |

FOREIGN PATENT DOCUMENTS

| | | |
|---|---|---|
| CN | 105170947 A | 12/2015 |
| CN | 106573282 A | 4/2017 |
| CN | 108311542 A | 7/2018 |
| CN | 112718867 A | 4/2021 |
| CN | 115608784 A | 1/2023 |
| CN | 115971263 A | 4/2023 |
| GB | 710893 A | 6/1954 |
| JP | S5647204 A | 4/1981 |
| JP | H04182010 A | 6/1992 |
| JP | H0890013 A | 4/1996 |
| RU | 2179900 C1 | 2/2002 |

OTHER PUBLICATIONS

Xiaofang Huang et al., "Manufacturing of a 3D finned tube for enhanced boiling and condensation using rolling-cutting- extruding composite forming", The International Journal of Advanced Manufacturing Technology, vol. 117, Aug. 13, 2021.

Wang Tao et al., "A process control system of stepped rolling for the cone type piercer and Accu-Roll Mill", Metallurgical Industry Automation, vol. 5, Sep. 25, 1995.

* cited by examiner

CONTINUOUS ROLLING DEVICE AND METHOD CONTINUOUS ROLLING DEVICE AND METHOD WITH INTERFACIAL TEMPERATURE-FORCE CONTROLLABILITY FOR SEAMLESS METAL CLADDING PIPE

CROSS REFERENCE TO RELATED APPLICATIONS

This application claims foreign priority of Chinese Patent Application No. 202310678462.8, filed on Jun. 9, 2023 in the China National Intellectual Property Administration, the disclosures of all of which are hereby incorporated by reference.

TECHNICAL FIELD

The present invention belongs to the field of seamless metal cladding pipe forming technologies, and particularly relates to a continuous rolling device and method with interfacial temperature-force controllability for a seamless metal cladding pipe.

BACKGROUND OF THE PRESENT INVENTION

With the development of modern science and technology, under extreme conditions such as petroleum, chemical engineering and geological exploration, the requirements for seamless metal cladding pipes are getting higher, which require excellent performances such as high strength, high temperature resistance and corrosion resistance. Although materials such as titanium alloy and duplex stainless steel can meet the above requirements, the materials are expensive, difficult to form and extremely high in cost. The seamless metal cladding pipe is formed by combining two or more component metals through interfaces, which may give full play to the performance advantages of the component metals, can meet the service performance requirements in harsh environments, and has good economy and broad application prospects.

Due to many advantages such as stable technology, continuous forming and high production efficiency, the roll bonding technology has become one of the most promising preparation technologies for the seamless metal cladding pipe. Carbon steel/stainless steel cladding pipes may be prepared by cold continuous roll bonding, but the interfaces only meet a mechanical bonding standard, with the defects such as uneven wall thickness and low interface strength. Aiming at these problems, the patent ZL202011450318.1 provides a three-roller skew rolling forming method for a metal cladding pipe with a corrugated junction surface, wherein a biting section, a forming section and a flattening section are sequentially arranged on the outer surface of the rolling roller, a single channel forming corrugation is arranged on the rolling roller, the forming corrugations are distributed between a tail end of the biting section and a tail end of the forming section, the forming corrugations on the three rolling rollers are distributed in a staggered manner, and the forming corrugations on the three rolling rollers successively make contact with an outer wall of a cladding pipe blank in sequence. Two technologies of corrugation rolling and corrugation flattening are integrated on one set of rolling rollers, and by obtaining a spatial spiral interface, a bonding strength of the interface is improved.

However, sufficient pressure, temperature and action time are needed to realize the metallurgical bonding of bonded interfaces, all of which have significant effects. The three-roller skew roll bonding technology can realize the continuous forming of the seamless metal cladding pipe. However, due to the uniform distribution of the skew rolling rollers in a circumferential direction and an inclined angle with a rolling axis, the skew rolling rollers have limited length and size, otherwise, cross-interference may occur, and the skew rolling rollers also need to be divided into three or four sections along axes of the rolling rollers, which leads to very short actual action time in a three-roller skew roll bonding process and the incapability of realizing complete metallurgical bonding of the bonded interfaces, thus seriously affecting the interface bonding performance and the uniformity.

SUMMARY OF PRESENT INVENTION

Aiming at the above problems, the present invention provides a continuous rolling device and method with interfacial temperature-force controllability for a seamless metal cladding pipe.

In order to achieve the above object, a technical solution used in the present invention is as follows.

A continuous rolling device with interfacial temperature-force controllability for a seamless metal cladding pipe comprises a multi-roller skew rolling mill set, an interfacial temperature-force controlled rolling mill set and a sizing and finishing mill set which are sequentially distributed along a rolling axis; wherein, the interfacial temperature-force controlled rolling mill set comprises an interface temperature control module and an interface pressure control module which are sequentially distributed along the rolling axis, the interface pressure control module comprises two racks and a plurality of controlled rolling rollers circumferentially and evenly distributed along the rolling axis, two ends of the controlled rolling roller are respectively mounted on the two racks through corresponding screwdown apparatuses, and the interface pressure control module realizes passive driving through a spiral pushing force of a skew roll bonding process of the multi-roller skew rolling mill set to a primary roll bonding blank and a traction force of the sizing and finishing mill set to an intermediate roll bonding blank; and the controlled rolling roller is divided into a controlled pressure bonding section, a finishing and rounding section and an unloading and expanding section, a length L1 of the controlled pressure bonding section is 40% to 80% of a length L of the controlled rolling roller, and a cone angle $\alpha_1$ of the controlled pressure bonding section is 0° to 10°; a length L2 of the finishing and rounding section is 20% to 40% of the length L of the controlled rolling roller, and a cone angle $\alpha_2$ of the finishing and rounding section is 0° to 2°; and a length L3 of the unloading and expanding section is 10% to 30% of the length L of the controlled rolling roller, and a cone angle $\alpha_3$ of the unloading and expanding section is 0° to 15°.

Further, the interface temperature control module comprises a thermometer, an annular water mist cooling apparatus and an electromagnetic induction heating apparatus which are sequentially arranged along the rolling axis, the thermometer is used for measuring a temperature of an outer surface of the primary roll bonding blank, the annular water mist cooling apparatus and the electromagnetic induction heating apparatus are respectively used for cooling and heating the primary roll bonding blank, an orientation of a spray nozzle of the annular water mist cooling apparatus is opposite to a motion direction of the seamless metal cladding pipe along the rolling axis, a spiral direction of the spray nozzle of the annular water mist cooling apparatus is opposite to a rotation direction of the seamless metal cladding pipe around the rolling axis, and the electromagnetic induction heating apparatus is used for heating the primary roll bonding blank.

Further, the electromagnetic induction heating apparatus is driven to reciprocate linearly along the rolling axis through a high-frequency telescopic cylinder, so as to heat the primary roll bonding blank evenly.

Further, the multi-roller skew rolling mill set comprises a plurality of tapered rolling rollers with an identical roller type and a plurality of identical guide plates, and the tapered rolling roller is sequentially provided with a biting section, a screwdown section, a finishing section and an expanding section along the rolling axis.

Further, the sizing and finishing mill set consists of a plurality of sizing rolling mills, and the sizing rolling mill comprises three or four sizing rolling rollers circumferentially and evenly distributed.

Further, a mandrel trolley, a mandrel, an online heating apparatus and a front rollgang which are sequentially arranged along the rolling axis are also arranged in front of the multi-roller skew rolling mill set, and a rear rollgang is also arranged behind the sizing and finishing mill set.

A continuous rolling method with interfacial temperature-force controllability for a seamless metal cladding pipe comprises the following steps of:

S1: online heating and heat preservation: sheathing and assembling an outer pipe material and an inner pipe material to obtain a pre-sheathed blank, connecting the mandrel trolley with the mandrel, placing the pre-sheathed blank above the front rollgang, making the mandrel penetrate through the middle of the pre-sheathed blank through the mandrel trolley and sending the pre-sheathed blank into the online heating apparatus to heat to a target temperature T, and then sending the pre-sheathed blank into the multi-roller skew rolling mill set for roll bonding;

S2: three-roller skew roll bonding: adjusting the tapered rolling roller and the guide plate of the multi-roller skew rolling mill set, setting a size of a target skew rolling hole pattern, starting the multi-roller skew rolling mill set, performing skew roll bonding on the pre-sheathed blank in the target skew rolling hole pattern surrounded by the mandrel, the roller and the guide plate jointly, making the pre-sheathed blank sequentially pass through the biting section, the screwdown section, the finishing section and the expanding section, so that a diameter is gradually reduced and a wall thickness is gradually reduced, so as to obtain the primary roll bonding blank, and making the primary roll bonding blank perform a rotary feeding motion under an action of skew roll bonding of the multi-roller skew rolling mill set 1 to enter the interfacial temperature-force controlled rolling mill set;

S3: controllable roll bonding: adjusting the controlled rolling roller of the interface pressure control module, setting a size of a target controlled rolling hole pattern and a target controlled rolling temperature, and measuring a temperature of an outer surface of the primary roll bonding blank by the thermometer located on an outlet side of the multi-roller skew rolling mill set, then adjusting on-off states of the annular water mist cooling apparatus and the electromagnetic induction heating apparatus to cool or heat the primary roll bonding blank to reach the target controlled rolling temperature, then rolling the primary roll bonding blank through the interface pressure control module to realize high-strength metallurgical bonding of a bonded interface, so as to obtain the intermediate roll bonding blank, and then making the intermediate roll bonding blank enter the sizing and finishing mill set;

S4: sizing and finishing rolling: setting a working quantity of the sizing rolling mills and a size of a target sizing hole pattern in the sizing and finishing mill set, performing sizing and finishing rolling on the intermediate roll bonding blank to achieve target size accuracy and roundness to further improve a surface quality, so as to obtain a finally rolled seamless metal cladding pipe, and then sending the finally rolled seamless metal cladding pipe out from the rear rollgang; and S5: heat treatment control: cutting off a head portion and a tail portion of the finally rolled seamless metal cladding pipe, cutting according to a certain size, and performing a heat treatment to obtain a target structure property, so as to obtain a finished seamless metal cladding pipe.

Compared with the prior art, the present invention has the following advantages:

according to the device of the present invention, processes of skew roll bonding, pressure diffusion, online rounding and finishing sizing of the seamless metal cladding pipe are integrated together, which significantly shortens a technological flow, improves production efficiency, and can realize accurate control of interface temperature, interface pressure and action time;

according to the present invention, the temperature of the primary roll bonding blank is measured through the interface temperature control module of the interfacial temperature-force controlled rolling mill set, and the primary roll bonding blank is cooled or heated online according to controlled rolling requirements, so as to obtain the target controlled rolling temperature, so that specific temperature requirements of metal bonded interfaces of different components in a pressure diffusion process may be met, and a large number of intermetallic compounds are avoided from forming at the bonded interface, thus weakening an interface bonding strength, and the electromagnetic induction heating apparatus performs high-frequency linear reciprocation along the rolling axis, which may avoid the phenomenon that a temperature of a coil position is high and a temperature of a coil gap part is low in an electromagnetic induction heating process, thus realizing uniform heating;

according to the present invention, the primary roll bonding blank is subjected to controlled rolling through the interface pressure control module of the interfacial temperature-force controlled rolling mill set, because the controlled rolling rollers of the interfacial temperature-force controlled rolling mill set are circumferentially and evenly distributed along the rolling axis, all the controlled rolling rollers are not easy to interfere with each other, and the length of the controlled rolling rollers is obviously increased, so that the action time is prolonged, the pressure diffusion in a controllable time can be further performed at the target controlled rolling temperature, the complete metallurgical bonding of the bonded interface is promoted, the bonding strength of the interface is obviously improved, and the continuous rounding function of the seamless metal cladding pipe can be synchronously realized, thus improving the comprehensive performance and size accuracy of the product;

according to the present invention, the interface pressure control module comprises the rack, the screwdown apparatus and the plurality of controlled rolling rollers circumferentially and evenly distributed along the rolling axis, and the passive driving of the interfacial temperature-force controlled rolling mill set can be realized by using the spiral pushing force of the skew roll bonding process of the multi-roller skew rolling mill set and the traction force of the sizing and finishing mill set during working of the controlled rolling rollers, so that the device is compact in structure, and simple and efficient to control; and according to the device of the present invention, the interface temperature, the interface pressure and the action time may be controlled synchronously based on a bonding mechanism of the bonded interface, which can realize the efficient continuous and stable forming of the high-quality seamless metal cladding pipe and the metallurgical bonding of the bonded interface, with the advantages of high production efficiency, short technological flow, high interface bonding strength, wide size and specification ranges, and the like.

Figure 1:
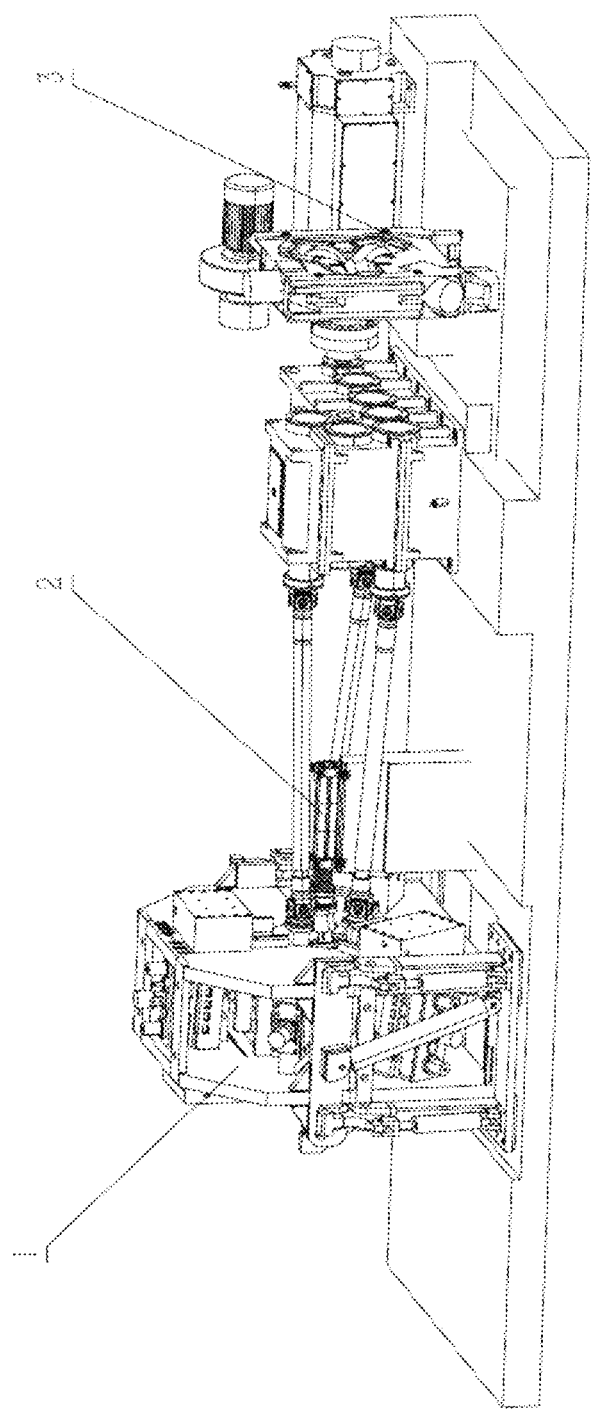
FIG. 1 is a schematic structural diagram of an overall device of the present invention.
Figure 2:
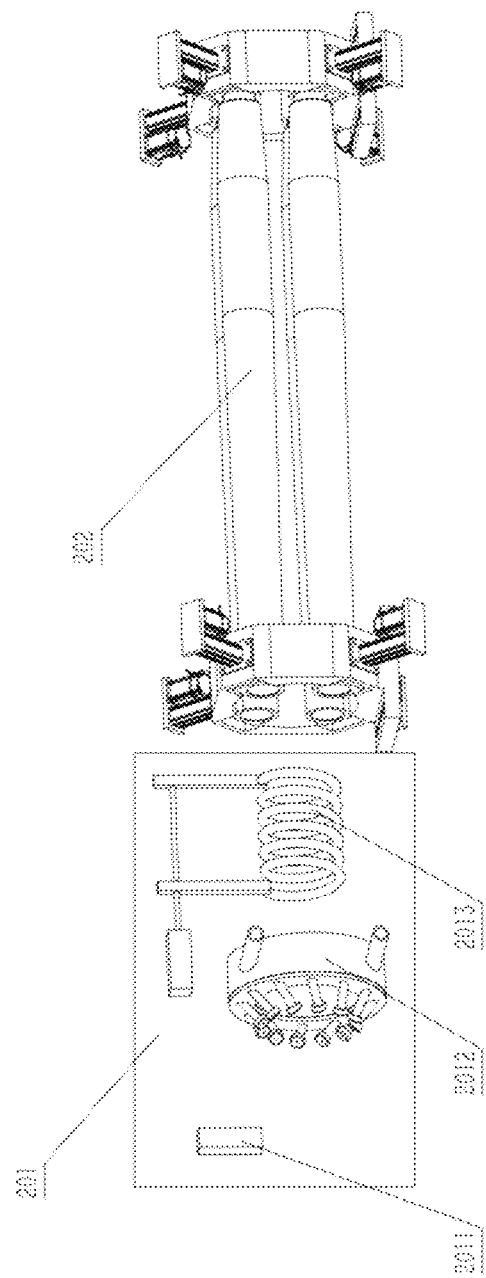
FIG. 2 is a schematic structural diagram of an interfacial temperature-force controlled rolling mill set in the present invention.
Figure 3:
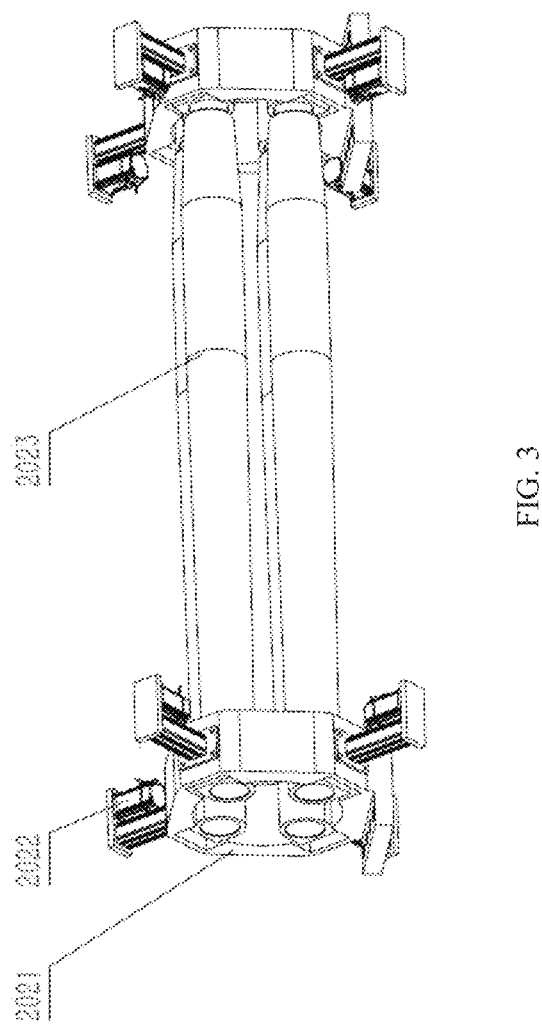
FIG. 3 is a schematic structural diagram of an interface pressure control module in the present invention.
Figure 4:
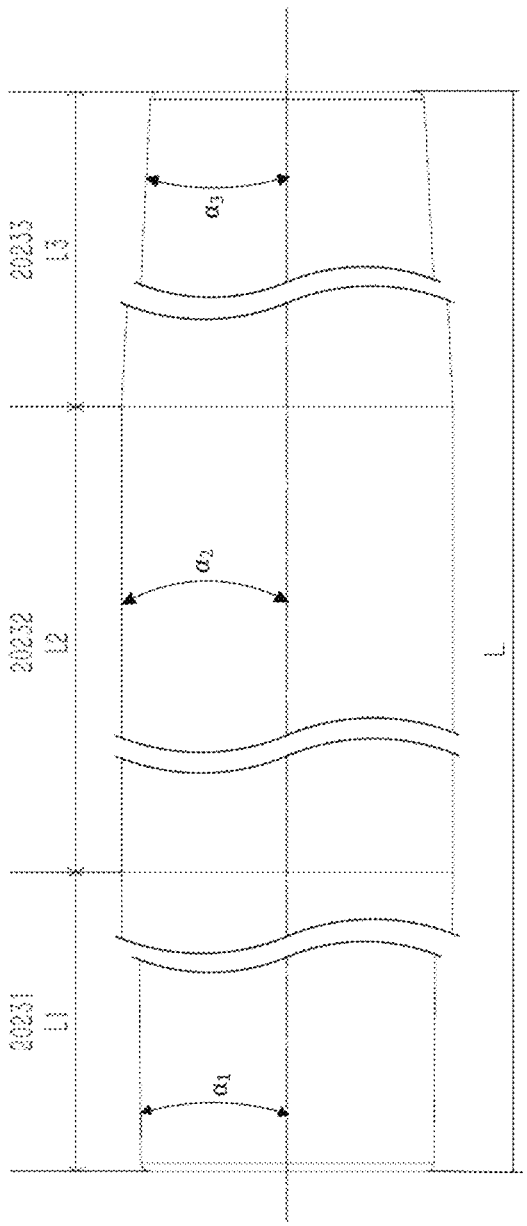
FIG. 4 is a schematic structural diagram of a controlled rolling roller in the present invention.

In the drawings, 1 refers to multi-roller skew rolling mill set, 2 refers to interfacial temperature-force controlled rolling mill set, 3 refers to sizing and finishing mill set, 201 refers to interface temperature control module, 202 refers to interface pressure control module, 2011 refers to thermometer, 2012 refers to annular water mist cooling apparatus, 2013 refers to electromagnetic induction heating apparatus, 2021 refers to rack, 2022 refers to screwdown apparatus, 2023 refers to controlled rolling roller, 20231 refers to controlled pressure bonding section, 20232 refers to finishing and rounding section, and 20233 refers to unloading and expanding section.

DETAILED DESCRIPTION OF PREFERRED EMBODIMENTS

In order to further explain the technical solution of the present invention, the present invention is further described hereinafter with reference to embodiments.

As shown in FIG. 1 to FIG. 4, a continuous rolling device with interfacial temperature-force controllability for a seamless metal cladding pipe comprises a multi-roller skew rolling mill set 1, an interfacial temperature-force controlled rolling mill set 2 and a sizing and finishing mill set 3 which are sequentially distributed along a rolling axis.

The multi-roller skew rolling mill set 1 comprises a plurality of tapered rolling rollers with an identical roller type and a plurality of identical guide plates, and the tapered rolling roller is sequentially provided with a biting section, a screwdown section, a finishing section and an expanding section along the rolling axis.

The interfacial temperature-force controlled rolling mill set 2 comprises an interface temperature control module 201 and an interface pressure control module 202 which are sequentially distributed along the rolling axis. The interface temperature control module 201 comprises a thermometer 2011, an annular water mist cooling apparatus 2012 and an electromagnetic induction heating apparatus 2013 which are sequentially arranged along the rolling axis, the thermometer 2011 is used for measuring a temperature of an outer surface of the primary roll bonding blank, the annular water mist cooling apparatus 2012 and the electromagnetic induction heating apparatus 2013 are respectively used for cooling and heating the primary roll bonding blank, an orientation of a spray nozzle of the annular water mist cooling apparatus 2012 is opposite to a motion direction of the seamless metal cladding pipe along the rolling axis, a spiral direction of the spray nozzle of the annular water mist cooling apparatus 2012 is opposite to a rotation direction of the seamless metal cladding pipe around the rolling axis, and the electromagnetic induction heating apparatus 2013 is driven to reciprocate linearly along the rolling axis through a high-frequency telescopic cylinder, so as to heat the primary roll bonding blank evenly. The interface pressure control module 202 comprises two racks 2021 and a plurality of controlled rolling rollers 2023 circumferentially and evenly distributed along the rolling axis, and two ends of the controlled rolling roller 2023 are respectively mounted on the two racks 2021 through corresponding screwdown apparatuses 2022. The controlled rolling roller 2023 is divided into a controlled pressure bonding section 20231, a finishing and rounding section 20232 and an unloading and expanding section 20233, and a length L1 of the controlled pressure bonding section 20231 is 40% to 80% of a length L of the controlled rolling roller 2023, and a cone angle $\alpha_1$ of the controlled pressure bonding section is 0° to 10°; a length L2 of the finishing and rounding section 20232 is 20% to 40% of the length L of the controlled rolling roller 2023, and a cone angle $\alpha_2$ of the finishing and rounding section is 0° to 2°; and a length L3 of the unloading and expanding section 20233 is 10% to 30% of the length L of the controlled rolling roller 2023, and a cone angle $\alpha_3$ of the unloading and expanding section is 0° to 15°. The interface pressure control module 202 realizes passive driving through a spiral pushing force of a skew roll bonding process of the multi-roller skew rolling mill set 1 to a primary roll bonding blank and a traction force of the sizing and finishing mill set 3 to an intermediate roll bonding blank.

The sizing and finishing mill set 3 consists of a plurality of sizing rolling mills, and the sizing rolling mill comprises three or four sizing rolling rollers circumferentially and evenly distributed.

A mandrel trolley, a mandrel, an online heating apparatus and a front rollgang which are sequentially arranged along the rolling axis are also arranged in front of the multi-roller skew rolling mill set 1, and a rear rollgang is also arranged behind the sizing and finishing mill set 3.

A continuous rolling method with interfacial temperature-force controllability for a seamless metal cladding pipe comprises the following steps of:

S1: online heating and heat preservation: sheathing and assembling an outer pipe material and an inner pipe material to obtain a pre-sheathed blank, connecting the mandrel trolley with the mandrel, placing the pre-sheathed blank above the front rollgang, making the mandrel penetrate through the middle of the pre-sheathed blank through the mandrel trolley and sending the pre-sheathed blank into the online heating apparatus to heat to a target temperature T, and then sending the pre-sheathed blank into the multi-roller skew rolling mill set 1 for roll bonding;

S2: three-roller skew roll bonding: adjusting the tapered rolling roller and the guide plate of the multi-roller skew rolling mill set 1, setting a size of a target skew rolling hole pattern, starting the multi-roller skew rolling mill set 1, performing skew roll bonding on the pre-sheathed blank in the target skew rolling hole pattern surrounded by the mandrel, the roller and the guide plate jointly, making the pre-sheathed blank sequentially pass through the biting section, the screwdown section, the finishing section and the expanding section, so that a diameter is gradually reduced and a wall thickness is gradually reduced, so as to obtain the primary roll bonding blank, and making the primary roll bonding blank perform a rotary feeding motion under an action of skew roll bonding of the multi-roller skew rolling mill set 1 to enter the interfacial temperature-force controlled rolling mill set 2;

S3: controllable roll bonding: adjusting the controlled rolling roller 2023 of the interface pressure control module 202, setting a size of a target controlled rolling hole pattern and a target controlled rolling temperature, and measuring a temperature of an outer surface of the primary roll bonding blank by the thermometer 2011 located on an outlet side of the multi-roller skew rolling mill set 1, then adjusting on-off states of the annular water mist cooling apparatus 2012 and the electromagnetic induction heating apparatus 2013 to cool or heat the primary roll bonding blank to reach the target controlled rolling temperature, then rolling the primary roll bonding blank through the interface pressure control module 202 to realize high-strength metallurgical bonding of a bonded interface, so as to obtain the intermediate roll bonding blank, and then making the intermediate roll bonding blank enter the sizing and finishing mill set 3;

S4: sizing and finishing rolling: setting a working quantity of the sizing rolling mills and a size of a target sizing hole pattern in the sizing and finishing mill set 3, performing sizing and finishing rolling on the intermediate roll bonding blank to achieve target size accuracy and roundness to further improve a surface quality, so as to obtain a finally rolled seamless metal cladding pipe, and then sending the finally rolled seamless metal cladding pipe out from the rear rollgang; and S5: heat treatment control: cutting off a head portion and a tail portion of the finally rolled seamless metal cladding pipe, cutting according to a certain size, and performing a heat treatment to obtain a target structure property, so as to obtain a finished seamless metal cladding pipe.

Figure 5:
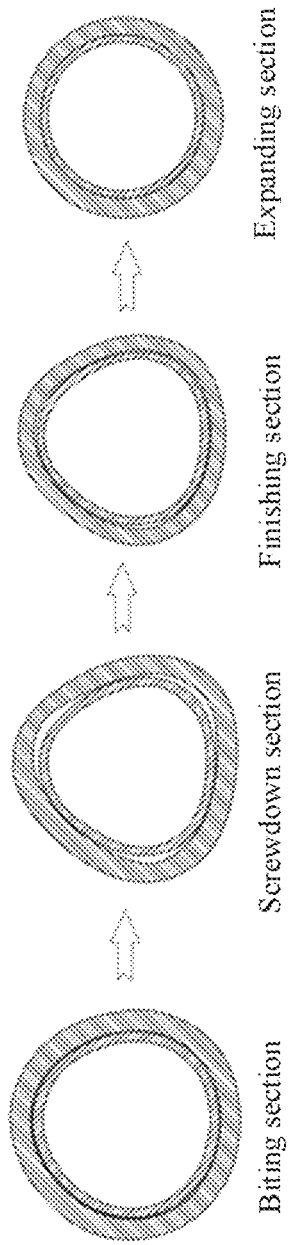
FIG. 5 is a schematic diagram of radial cross-section changes of various sections in a three-roller screw roll bonding process.

In the three-roller screw roll bonding process, the pre-sheathed blank needs to go through the biting section, the screwdown section, the finishing section and the expanding section in sequence, and radial cross-section change processes of various sections are shown in FIG. 5, with radial cross-section shapes going through a change process of regular circle—triangle—regular circle in the whole process. In the biting section, there is a compressive stress at a contact position between the pre-sheathed blank and the three rolling rollers, and local compressive deformation occurs. Meanwhile, the inner pipe material is pressed close to the mandrel, and the change process from the regular circle to the triangle begins. However, due to different materials and wall thicknesses of the outer pipe material and the inner pipe material, deformation degrees of the two pipe materials at positions having no contact with the rolling rollers are different, which is namely a harmonious deformation phenomenon, and there is a separation phenomenon between the outer pipe material and the inner pipe material. In the screwdown section and the finishing section, the pre-sheathed blank performs a spiral forward motion in the three-roller screw roll bonding process, and the outer pipe material and the inner pipe material are always in alternating states of contact and separation. There is an obvious macroscopic gap when the two pipe materials are separated, which means that even basic complete contact between the two pipe materials cannot be realized, and only when the radial cross-section recovers to the regular circle after reaching the tail end of the finishing section or the expanding section can the outer pipe material and the inner pipe material truly achieve complete contact.

Figure 6:
FIG. 6 is a schematic diagram of a radial cross-section obtained by emergent stop rolling jamming in the three-roller screw roll bonding process.

However, it can be seen from three elements of interface bonding that the interface temperature, the interface pressure and the action time are all very important. Because the rolling rollers are distributed in an inclined and stagger manner along a space in the three-roller screw roll bonding process, the lengths of the rolling rollers cannot be very long, otherwise, the rolling rollers may interference with each other. FIG. 6 shows a radial cross-section obtained by emergent stop rolling jamming in the three-roller screw roll bonding process. There is the obvious gap between the inner pipe material and the outer pipe material, leading to failure of interface bonding, and even after subsequently passing through the expanding section, there is no obvious plastic deformation due to very short passing time and very small deformation, so that the interface pressure is very small and the action time is very short, which is not conducive to the interface bonding.

Figure 7:
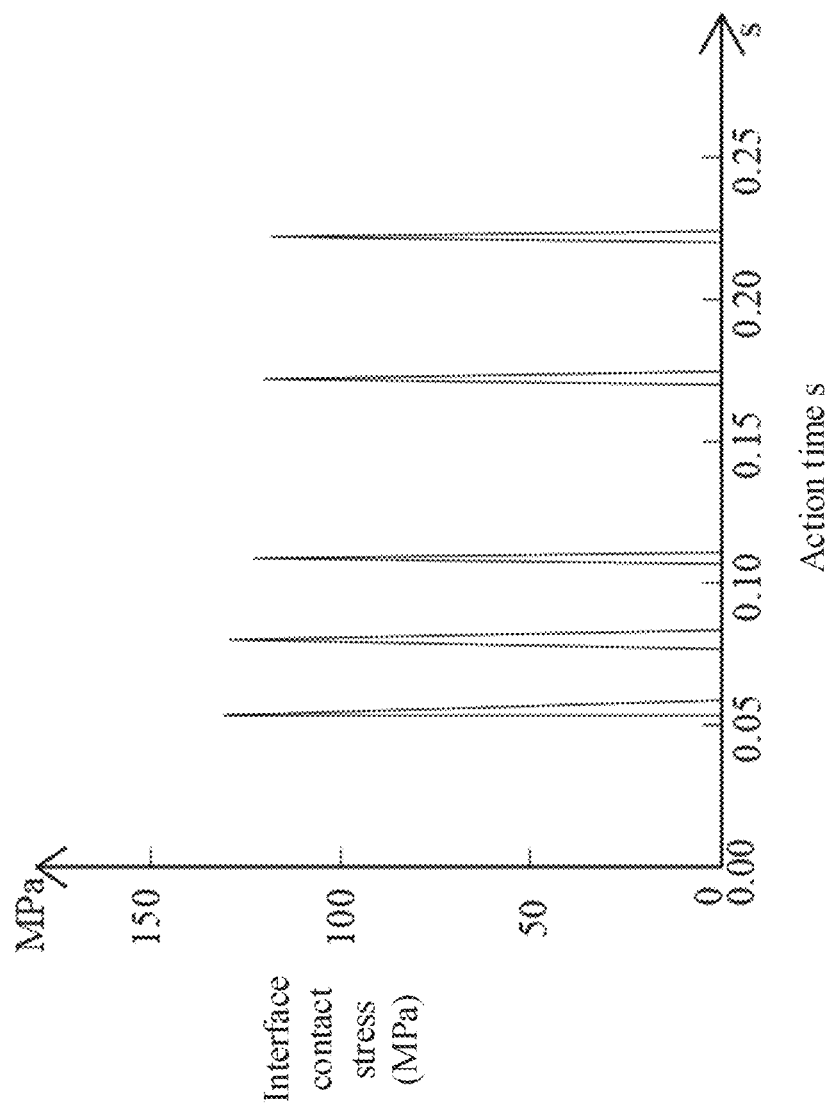
FIG. 7 is a schematic diagram of a change trend of an interface contact pressure in the three-roller screw roll bonding process.
Figure 8:
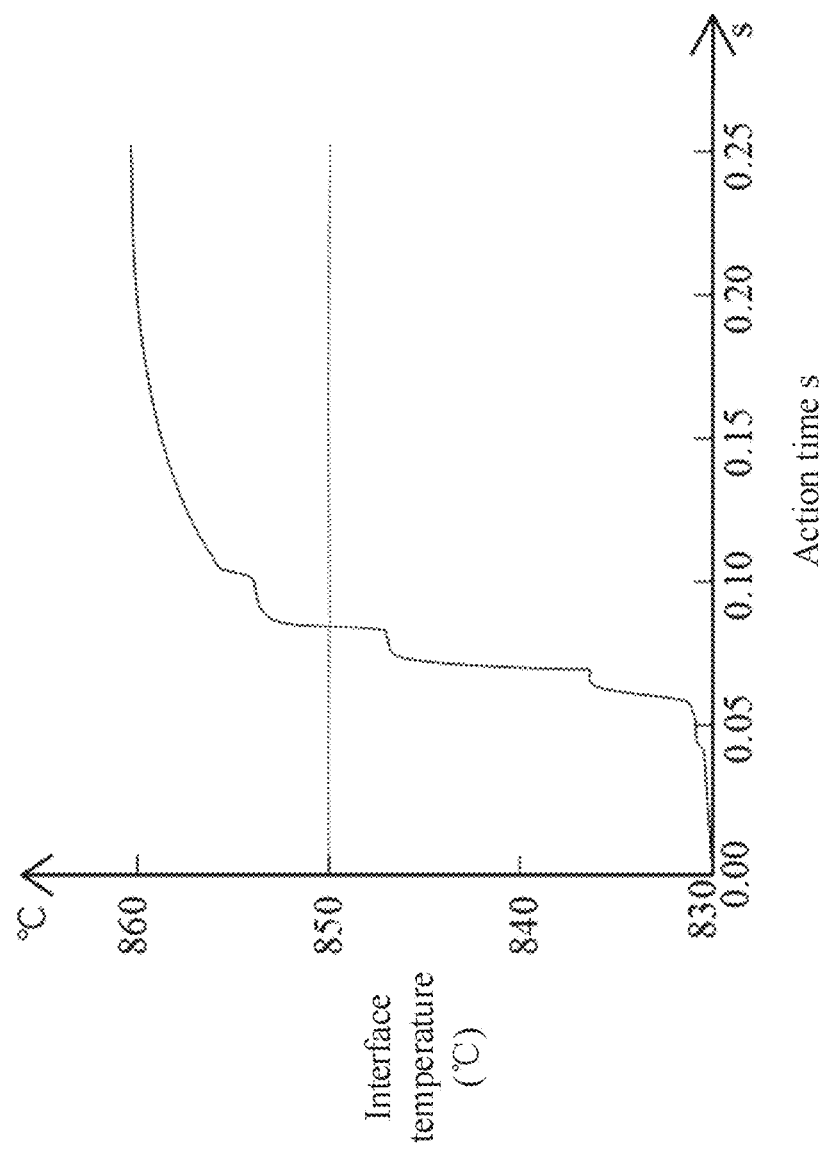
FIG. 8 is a schematic diagram of a change trend of an interface temperature in the three-roller screw roll bonding process.

In the three-roller screw roll bonding process, due to a structure and a rolling principle of the three-roller skew rolling device, a contact pressure between an outer surface of the inner pipe material and an inner surface of the outer pipe material does not always exist. A change of the contact pressure in the three-roller screw roll bonding process is shown in FIG. 7. Under actions of the skew rolling rollers, there may be a transient contact pressure between the outer pipe material and the inner pipe material, and when the outer pipe material and the inner pipe material reach between two skew rolling rollers, the outer pipe material and the inner pipe material have no contact due to the gap, so that the contact pressure is zero, leading to failure of bonding. A change of the temperature in the three-roller screw roll bonding process is shown in FIG. 8. Although the interface bonding is not realized under the actions of the skew rolling rollers, significant plastic deformation still occurs, and the severe plastic deformation may cause the rise of the temperature, which means that the temperature after the screw roll bonding is higher than an initial heating temperature. For the matching of components such as titanium/steel sensitive to the interface temperature, a large number of intermetallic compounds may be produced in the bonding process after the temperature is higher than 850° C., and even if the interface bonding is realized, the intermetallic compounds will further weaken the bonded interface, thus failing to realize high-strength bonding.

Figure 9:
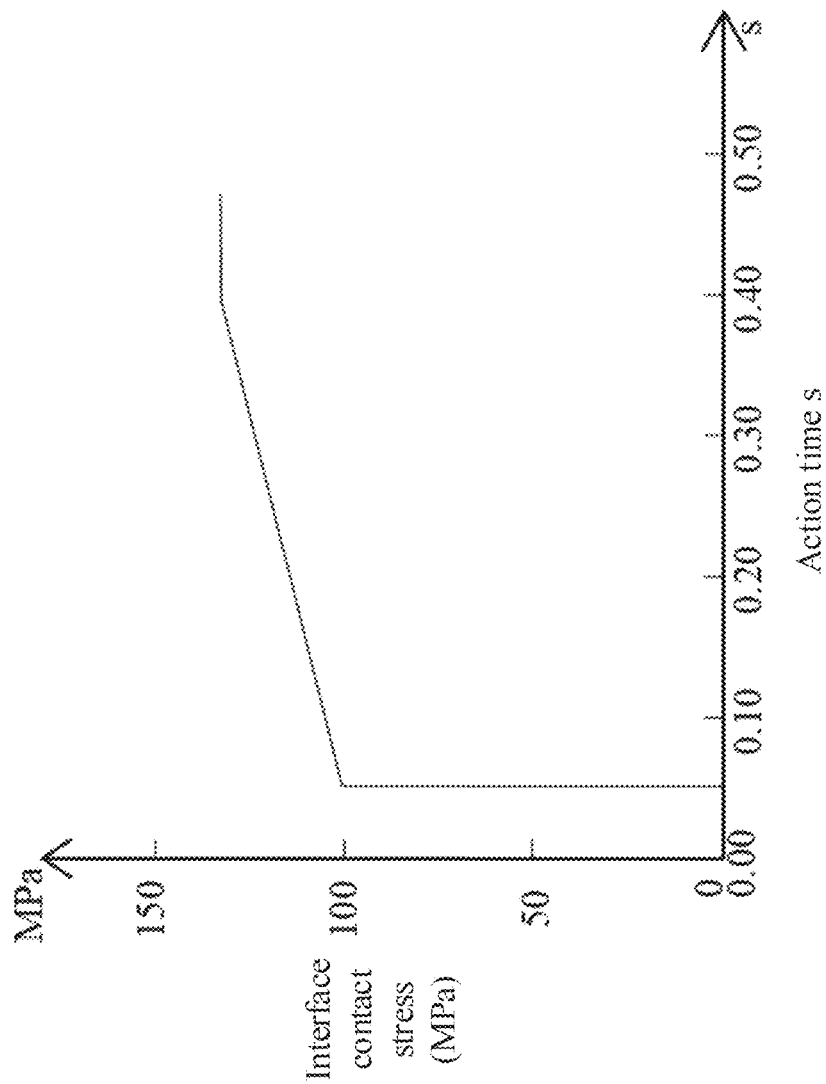
FIG. 9 is a schematic diagram of a change trend of an interface contact pressure in the temperature-force controlled roll bonding process.
Figure 10:
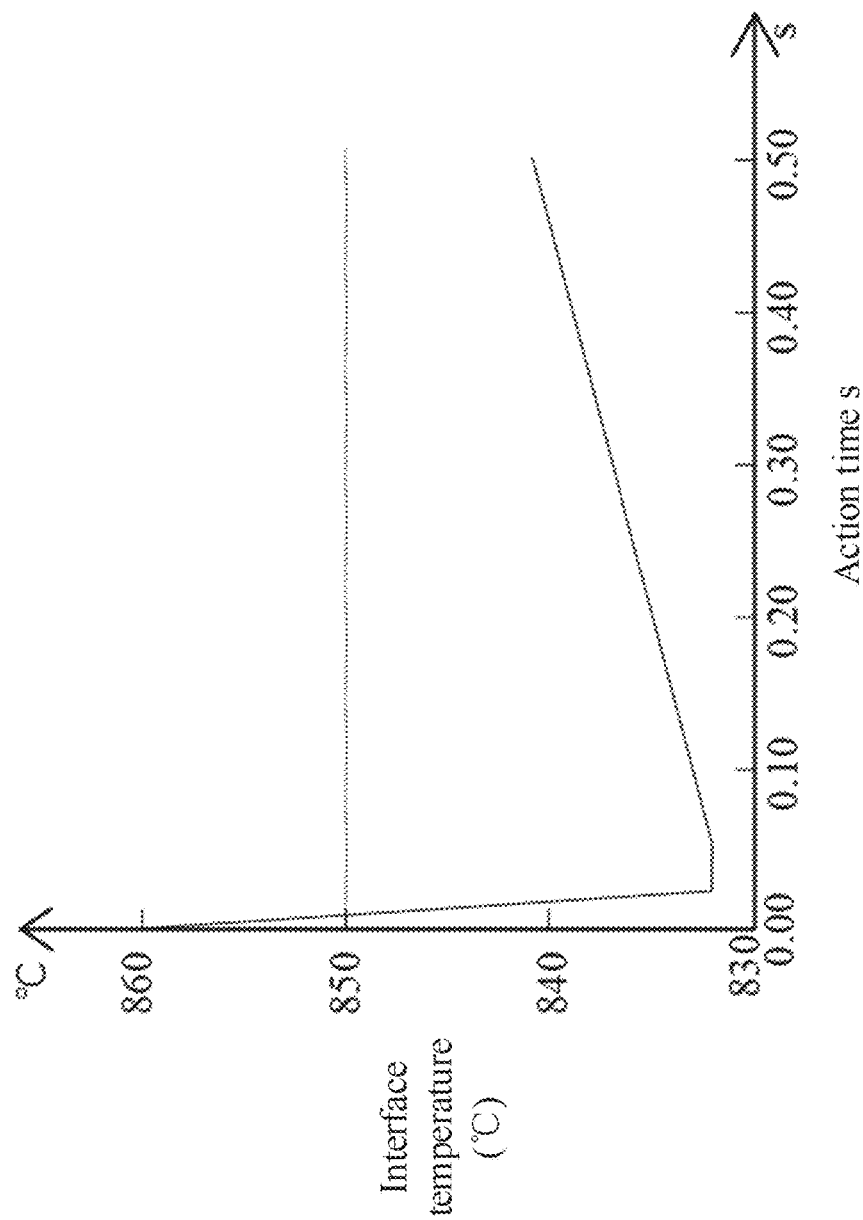
FIG. 10 is a schematic diagram of a change trend of an interface temperature in the temperature-force controlled roll bonding process.

In the temperature-force controlled roll bonding process, the controlled rolling rollers 2023 of the interfacial temperature-force controlled rolling mill set 2 are circumferentially and evenly distributed, the contact pressure between the outer surface of the inner pipe material and the inner surface of the outer pipe material always exists, and the interface temperature and the action time may both be subjected to finishing control. FIG. 9 is a schematic diagram of a change trend of the interface contact pressure in the temperature-force controlled roll bonding process. When the interface bonding is failed after the primary roll bonding blank goes through the three-roller skew roll bonding, the interface has no obvious contact stress in the interface temperature control module 201, but after the primary roll bonding blank enters the interface pressure control module 202, the interface begins to have a continuous contact stress, which is gradually increased with the increase of the deformation of the controlled pressure bonding section 20231, and the maximum deformation is achieved in the finishing and rounding section 20232, so that the metallurgical bonding of the bonded interface is realized. After being gradually unloaded from the unloading and expanding section 20233, the outer pipe material and the inner pipe material will not be separated. FIG. 10 is a schematic diagram of a change trend of the interface temperature in the temperature-force controlled roll bonding process. After the primary roll bonding blank enters the interface temperature control module 201, the target interface temperature is controlled first, and for a titanium/steel cladding pipe, the interface temperature is quickly reduced to below 850° C. Then, although the temperature is increased due to plastic deformation, the interface temperature is slightly increased slowly due to the smooth and uniform deformation process, which ensures that the interface does not produce obvious intermetallic compounds, thus realizing high-strength metallurgical bonding of the bonded interface.

The interface temperature, the interface pressure and the action time may be controlled synchronously based on a bonding mechanism of the bonded interface, the temperature-force controlled rolling can realize the efficient continuous and stable forming of the high-quality seamless metal cladding pipe and the metallurgical bonding of the bonded interface, so as to obtain the target structure property, with the advantages of high production efficiency, short technological flow, high interface bonding strength, wide size and specification ranges, and the like.

The main features and advantages of the present invention are shown and described above. It is apparent for those skilled in the art that the present invention is not limited to the details of the above exemplary embodiments, and the present invention can be realized in other specific forms without departing from the spirit or basic characteristics of the present invention. Therefore, the embodiments should be regarded as being exemplary and non-limiting from any point of view, and the scope of the present invention is defined by the appended claims rather than the above description, so that it is intended to comprise all changes falling within the meaning and range of equivalent elements of the claims.

In addition, it should be understood that although the description is described according to the embodiments, each embodiment does not contain only one independent technical solution. The narration mode of the description is only for purpose of clarifying, and those skilled in the art should take the description as a whole. The technical solutions in each embodiment may also be combined appropriately to form other embodiments that may be understood by those skilled in the art.

We claim:

1. A continuous rolling device with interfacial temperature-force controllability for a seamless metal cladding pipe, comprising a multi-roller skew rolling mill set (1), an interfacial temperature-force controlled rolling mill set (2) and a sizing and finishing mill set (3) which are sequentially distributed along a rolling axis; wherein, the interfacial temperature-force controlled rolling mill set (2) comprises an interface temperature control module (201) and an interface pressure control module (202) which are sequentially distributed along the rolling axis, the interface pressure control module (202) comprises two racks (2021) and a plurality of controlled rolling rollers (2023) circumferentially and evenly distributed along the rolling axis, two ends of each of the controlled rolling rollers (2023) are respectively mounted on the two racks (2021) through corresponding screwdown apparatuses (2022), and the interface pressure control module (202) realizes passive driving through a spiral pushing force of a skew roll bonding process of the multi-roller skew rolling mill set (1) to a primary roll bonding blank and a traction force of the sizing and finishing mill set (3) to an intermediate roll bonding blank; and the controlled rolling roller (2023) is divided into a controlled pressure bonding section (20231), a finishing and rounding section (20232) and an unloading and expanding section (20233), a length L1 of the controlled pressure bonding section (20231) is 40% to 80% of a length L of the controlled rolling roller (2023), and a cone angle $\alpha_1$ of the controlled pressure bonding section is 0° to 10°; a length L2 of the finishing and rounding section (20232) is 20% to 40% of the length L of the controlled rolling roller (2023), and a cone angle $\alpha_2$ of the finishing and rounding section is 0° to 2°; and a length L3 of the unloading and expanding section (20233) is 10% to 30% of the length L of the controlled rolling roller (2023), and a cone angle as of the unloading and expanding section is 0° to 15°.

2. The continuous rolling device with interfacial temperature-force controllability for the seamless metal cladding pipe according to claim 1, wherein the interface temperature control module (201) comprises a thermometer (2011), an annular water mist cooling apparatus (2012) and an electromagnetic induction heating apparatus (2013) which are sequentially arranged along the rolling axis, the thermometer (2011) is used for measuring a temperature of an outer surface of the primary roll bonding blank, the annular water mist cooling apparatus (2012) and the electromagnetic induction heating apparatus (2013) are respectively used for cooling and heating the primary roll bonding blank, an orientation of a spray nozzle of the annular water mist cooling apparatus (2012) is opposite to a motion direction of the seamless metal cladding pipe along the rolling axis, a spiral direction of the spray nozzle of the annular water mist cooling apparatus (2012) is opposite to a rotation direction of the seamless metal cladding pipe around the rolling axis, and the electromagnetic induction heating apparatus (2013) is used for heating the primary roll bonding blank.

3. The continuous rolling device with interfacial temperature-force controllability for the seamless metal cladding pipe according to claim 2, wherein the electromagnetic induction heating apparatus (2013) is driven to reciprocate linearly along the rolling axis through a telescopic cylinder, so as to heat the primary roll bonding blank evenly.

4. The continuous rolling device with interfacial temperature-force controllability for the seamless metal cladding pipe according to claim 3, wherein the multi-roller skew rolling mill set (1) comprises a plurality of tapered rolling rollers with an identical roller type and a plurality of identical guide plates, and each of the tapered rolling rollers is sequentially provided with a biting section, a screwdown section, a finishing section and an expanding section along the rolling axis.

5. The continuous rolling device with interfacial temperature-force controllability for the seamless metal cladding pipe according to claim 4, wherein the sizing and finishing mill set (3) consists of a plurality of sizing rolling mills, and each of the sizing rolling mills comprises three or four sizing rolling rollers circumferentially and evenly distributed.

6. The continuous rolling device with interfacial temperature-force controllability for the seamless metal cladding pipe according to claim 5, wherein a mandrel trolley, a mandrel, an online heating apparatus and a front rollgang which are sequentially arranged along the rolling axis are also arranged in front of the multi-roller skew rolling mill set (1), and a rear rollgang is also arranged behind the sizing and finishing mill set (3).

7. A rolling method based on the continuous rolling device with interfacial temperature-force controllability for the seamless metal cladding pipe according to claim 6, comprising the following steps of:
 S1: online heating and heat preservation: sheathing and assembling an outer pipe material and an inner pipe material to obtain a pre-sheathed blank, connecting the mandrel trolley with the mandrel, placing the pre-sheathed blank above the front rollgang, making the mandrel penetrate through the middle of the pre-sheathed blank through the mandrel trolley and sending the pre-sheathed blank into the online heating apparatus to heat to a target temperature T, and then sending the pre-sheathed blank into the multi-roller skew rolling mill set (1) for roll bonding;
 S2: three-roller skew roll bonding: adjusting the tapered rolling roller and the guide plate of the multi-roller skew rolling mill set (1), setting a size of a target skew rolling hole pattern, starting the multi-roller skew rolling mill set (1), performing skew roll bonding on the pre-sheathed blank in the target skew rolling hole pattern surrounded by the mandrel, the roller and the guide plate jointly, making the pre-sheathed blank sequentially pass through the biting section, the screwdown section, the finishing section and the expanding section, so that a diameter is gradually reduced and a wall thickness is gradually reduced, so as to obtain the primary roll bonding blank, and making the primary roll bonding blank perform a rotary feeding motion under an action of skew roll bonding of the multi-roller skew rolling mill set (1) to enter the interfacial temperature-force controlled rolling mill set (2);
 S3: controllable roll bonding: adjusting the controlled rolling roller (2023) of the interface pressure control module (202), setting a size of a target controlled rolling hole pattern and a target controlled rolling temperature, and measuring a temperature of an outer surface of the primary roll bonding blank by the thermometer (2011) located on an outlet side of the multi-roller skew rolling mill set (1), then adjusting on-off states of the annular water mist cooling apparatus (2012) and the electromagnetic induction heating apparatus (2013) to cool or heat the primary roll bonding blank to reach the target controlled rolling temperature, then rolling the primary roll bonding blank through the interface pressure control module (202) to realize high-strength metallurgical bonding of a bonded interface, so as to obtain the intermediate roll bonding blank, and then making the intermediate roll bonding blank enter the sizing and finishing mill set (3);
 S4: sizing and finishing rolling: setting a working quantity of the sizing rolling mills and a size of a target sizing hole pattern in the sizing and finishing mill set (3), performing sizing and finishing rolling on the intermediate roll bonding blank to achieve target size accuracy and roundness to further improve a surface quality, so as to obtain a finally rolled seamless metal cladding pipe, and then sending the finally rolled seamless metal cladding pipe out from the rear rollgang; and
 S5: heat treatment control: cutting off a head portion and a tail portion of the finally rolled seamless metal cladding pipe, cutting according to a certain size, and performing a heat treatment to obtain a target structure property, so as to obtain a finished seamless metal cladding pipe.

* * * * *